United States Patent [19]

Asano et al.

[11] 4,317,364

[45] Mar. 2, 1982

[54] SELF-TESTING CONTROL SYSTEM FOR AN INTERNAL COMBUSTION ENGINE

[75] Inventors: Masaharu Asano, Yokosuka; Hidetoshi Kanegae, Yokohama, both of Japan

[73] Assignee: Nissan Motor Company, Limited, Kanagawa, Japan

[21] Appl. No.: 132,422

[22] Filed: Mar. 21, 1980

[30] Foreign Application Priority Data

Mar. 23, 1979 [JP] Japan ................................ 54-33879

[51] Int. Cl.³ ........................................... G01M 15/00

[52] U.S. Cl. ................................. 73/117.3; 340/52 F

[58] Field of Search ................. 73/117.3, 116; 60/277; 364/424, 551; 340/52 F

[56] References Cited

U.S. PATENT DOCUMENTS

| | | | |
|---|---|---|---|
| 4,122,720 | 10/1978 | Podl | 60/277 X |
| 4,128,885 | 12/1978 | Valek et al. | 364/424 |
| 4,234,921 | 11/1980 | Kinoshita et al. | 73/116 X |

FOREIGN PATENT DOCUMENTS

| | | |
|---|---|---|
| 1306364 | 2/1973 | United Kingdom . |
| 1373391 | 11/1974 | United Kingdom . |
| 1463057 | 2/1977 | United Kingdom . |

*Primary Examiner*—Jerry W. Myracle

*Attorney, Agent, or Firm*—Lowe, King, Price & Becker

[57] ABSTRACT

An internal combustion engine self-testing control system has a microcomputer, which includes a memory unit pre-programmed with a program for testing the microcomputer. The system is so programmed as to be able to test itself by using an indicator to show the system state before controlling actuators that affect the engine operating values. That is, since it is impossible to test the system merely by observing the indicator states produced by the system, one or more test processes are added before controlling the actual engine operating values. In one example, the test timing is controlled by a power signal generated when the power supply is turned on, a start signal is generated when a starting switch is turned on (while the engine is being cranked), and a revolution indicating signal is generated when the engine is rotating. In this case, the checking is carried out somewhere in the interval between instigating of the power signal and the end of start signal, between the beginning of the start signal and the end of the start signal, or somewhere between instigation of the power signal and the beginning of the start signal, etc. Therefore, by observing the indicator states in the system whenever the power switch and the starting switch are turned on, it is possible to readily test the control system for an internal combustion engine.

22 Claims, 4 Drawing Figures

SELF-TESTING CONTROL SYSTEM FOR AN INTERNAL COMBUSTION ENGINE

BACKGROUND OF THE INVENTION

1. Field of the Invention

The present invention relates generally to a self-testing control system for an internal combustion engine, and more particularly to a control system, preprogrammed memory unit having a program for testing the microcomputer so it executes necessary decisions and processes.

2. Description of the Prior Art

Recently, various control systems using a microcomputer have been developed to control operating values of an internal combustion engine; typical controlled operating values are fuel injection rate, ignition timing, exhaust gas recirculation, catalyst temperature, etc. A conventional analog or digital circuit for controlling an internal combustion engine operating value, is usually be tested by supplying a particular input signal to an actuator that affects the operating value. An output value obtained in response to the actuator being driven by the input signal is compared with a predetermined reference value. In this case, since a conventional circuit is relatively simple in structure, it is comparatively easy to test the circuit. On the other hand, in a control system using a microcomputer having a central processing unit (CPU), it is not possible readily to extract the necessary data from the CPU and to decide whether the control system is operating normally since all the arithmetic operations are executed in the CPU in time sharing mode. Even if such testing were possible, it would be complicated and expensive to realize a test program for testing such a control system using a microcomputer.

In addition, it is very difficult to decide whether the microcomputer is out of order, or whether the actuators and sensors for controlling the above-mentioned operating values, such as fuel injection rate, ignition timing, and exhaust gas recirculation, are not operating, or whether other electrical circuits, than the microcomputer, or mechanical parts are damaged. Therefore, when repairing the system in a repair shop it is necessary to test the system by removing the microcomputer completely even if the microcomputer is in fact operating normally.

In addition, the microcomputer is generally installed in the control system at a position where it is relatively difficult to remove, from the standpoint of protection from vibration; accordingly it is more difficult to conduct a test of the microcomputer provided for a control system with the microcomputer installed in position.

SUMMARY OF THE INVENTION

With the above problem in mind, therefore, it is the primary object of the present invention to provide a new and improved self-testing control system for an internal combustion engine, wherein the control system includes a memory unit preprogrammed with a test program for testing the microcomputer without any special apparatus, and without removing the microcomputer from the vehicle.

It is another object of the present invention to provide a self-testing control system for an internal combustion engine in which timing signals to start the test are responsive to a power signal generated when a power supply is turned on, a start signal generated when the engine is being cranked, and a revolution indicating signal generated when the engine is rotating.

It is a further object of the present invention to provide a self-testing control system for an internal combustion engine in which the time interval between an instant in power signal and the beginning of a start signal, between an instant in a power signal and the end of a start signal, or between the beginning of a start signal and the end of a start signal, and so on are used for testing the system.

It is still a further object of the present invention is to provide a self-testing control system for an internal combustion engine in which engine operating values, such as catalyst temperature, fuel injection rate, ignition advance angle, and exhaust gas recirculation, rate are controlled.

It is still a further object of the present invention to provide a self-testing control system for an internal combustion engine in which are displayed both the states of the starting signals and the actually detected states of engine operating values.

With the above and other objects in view, the present invention provides a self-testing control system for an internal combustion engine. The system comprises a memory unit pre-programmed with a test program for testing a computer which controls operating values of the internal combustion engine. By using this system, it is possible to decide whether the computer is operating normally when a predetermined checking procedure is carried out in accordance with the test program for the microcomputer.

The above and other related objects and features of the invention will be apparent from the following description of the disclosure illustrated in the accompanying drawings and the novelty thereof pointed out in the appended claims.

BRIEF DESCRIPTION OF THE DRAWINGS

The features and advantages of the self-testing control system for an internal combustion engine according to the present invention over a prior-art control system will be more apparent from the following description of the preferred embodiments of the invention taken in conjunction with the accompanying drawings in which.

DESCRIPTION OF THE PREFERRED EMBODIMENTS

Figure 1:
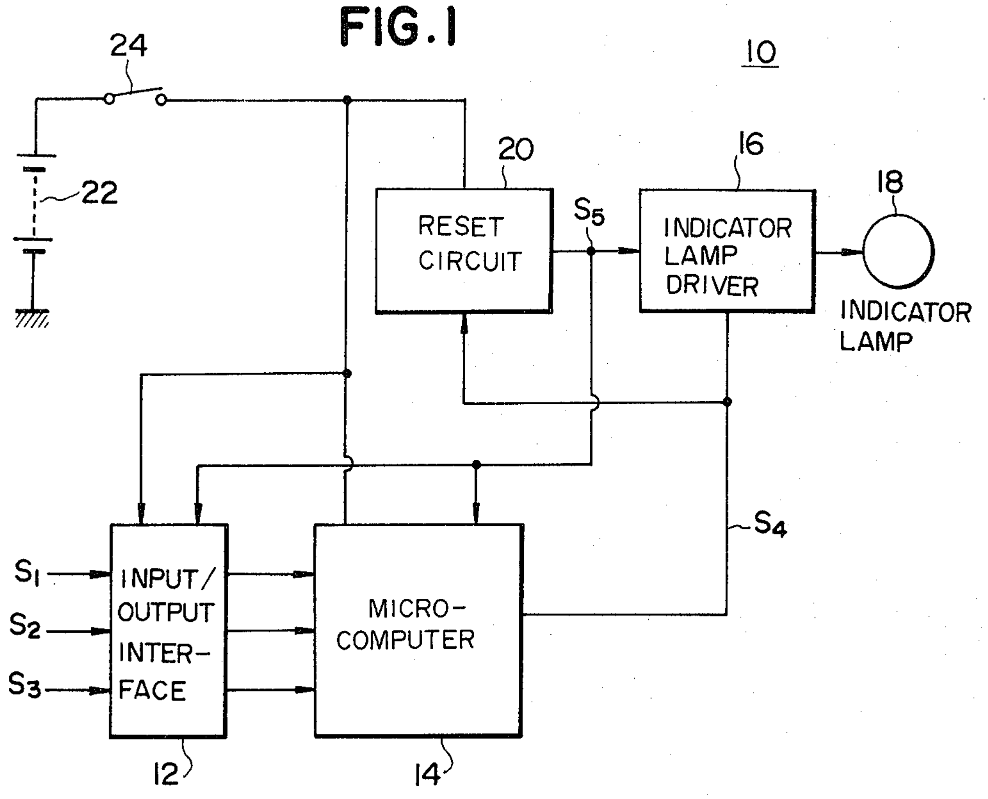
FIG. 1 is a schematic block diagram showing an example of the self-testing control system of the present invention.
Figure 2:
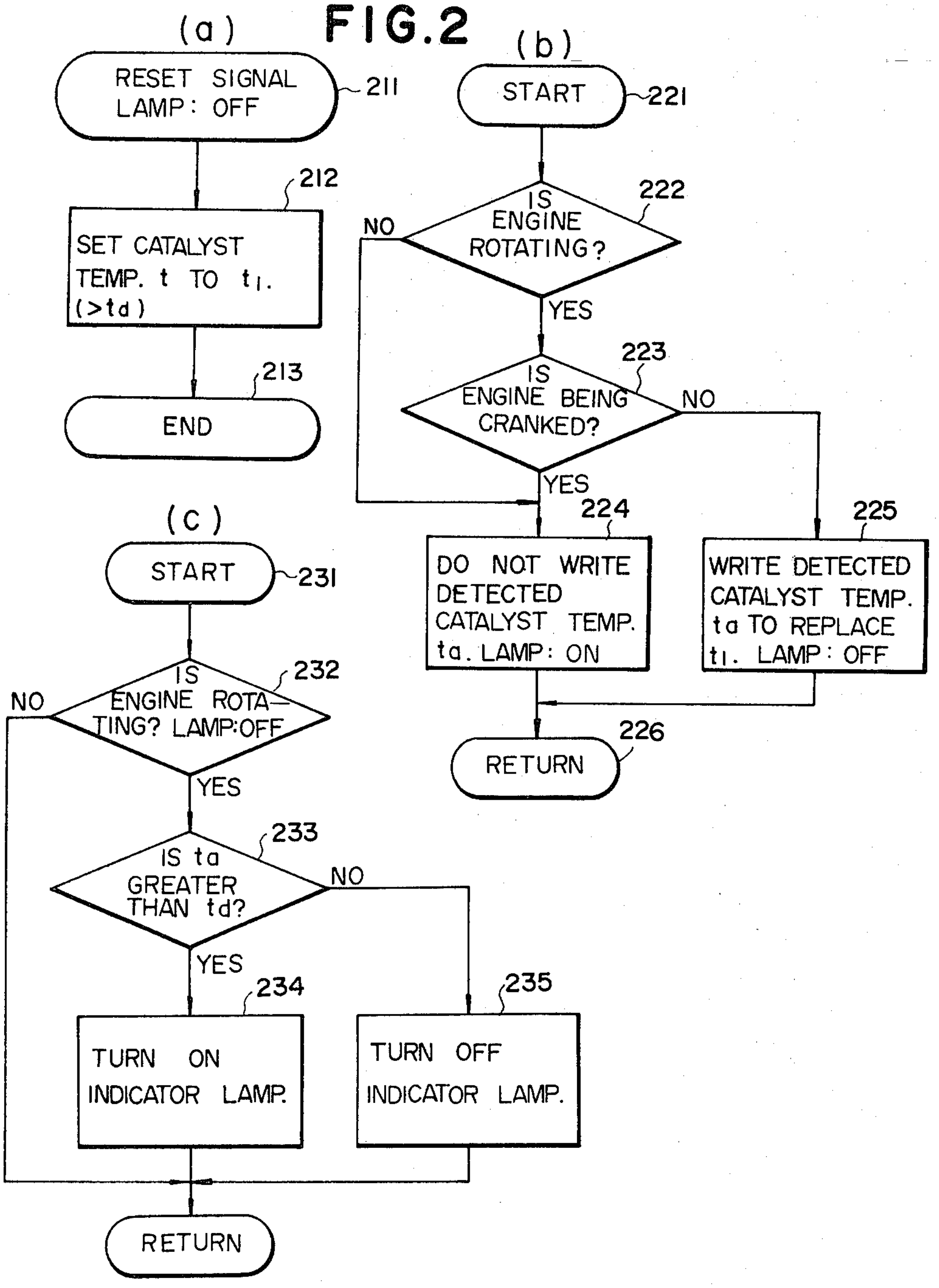
FIG. 2 consists of three flowcharts showing an example of the test procedure of the present invention.

In FIGS. 1 and 2 is illustrated a first preferred embodiment of the present invention. In this case, self-testing control system 10 is so configured as to control catalyst temperature and to provide an alarm function.

In the self-testing control system 10 of FIG. 1, an input/output interface 12 receives an engine revolution signal $S_1$ indicating that the engine is rotating, an engine start signal $S_2$ indicating that the engine is being started (in cranking condition), and a catalyst temperature signal $S_3$ indicating the temperature of a catalytic apparatus for purifying exhaust gas, converts these signals $S_1$, $S_2$, and $S_3$ from analog to digital if necessary, and supplies these signals to a microcomputer 14 (including a central processing unit and a memory unit). When the catalyst temperature t exceeds a predetermined danger temperature $t_d$, the microcomputer 14 supplies a signal $S_4$ to an indicator lamp driver 16 to turn on an indicator lamp 18, thus indicating that the catalyst temperature is abnormally high. Also, a reset circuit 20 can reset the input/output interface 12, the microcomputer 14, and the indicator lamp river 16, when the power supply 22 is turned on with a power switch 24.

In FIG. 1, although other control devices are necessary in order to control the catalyst temperature, only the alarm function is illustrated since the other devices are not directly related to the main subject of the present invention.

In the memory unit of microcomputer 14 is pre-programmed a test program for testing system 10 and the microcomputer.

By operating the control system shown in FIG. 1 in accordance with programs shown as flowcharts in FIG. 2, it is possible to test all functions and to control catalyst temperatures of an internal combustion engine.

In this system, first, when the power switch 24 is turned on, i.e. closed, power from D.C. source 22 is supplied to the system 10. Consequently, a reset signal $S_5$ derived from the reset circuit 20 initializes the internal conditions of the microcomputer 14. That is, the reset signal $S_5$ resets the indicator lamp driver 16 to make the indicator lamp 18 go off (block 211 in FIG. 2(*a*))

Under these conditions, microcomputer 14 begins to operate in accordance with the program shown in FIG. 2(*a*).

First, the catalyst temperature t in the computer 14 is initialized to a predetermined temperature $t_1$ which is higher than a danger temperature $t_d$ (block 212) before an actual detected catalyst temperature $t_a$ is read into the memory of microcomputer 14.

Next, the process shown in FIG. 2(*b*) is repeatedly executed by returning to block 221 from block 226 at fixed time intervals in accordance with interrupt signals; for example, signals are derived whenever arithmetic operations to convert an analog catalyst temperature signal $S_3$ to a digital signal are completed.

In the flowchart of FIG. 2(*b*), the first engine operating condition check is whether the engine is rotating or not (block 222). If the engine is rotating, the program proceeds to, block 223 to check as to whether the engine is being cranked. If the engine is rotating and is not being cranked, that is, if the engine is in normal operation, signal $S_3$ indicative of actual detected catalyst temperature $t_a$ supplied to the memory in microcomputer 14 via interface 12 to replace $t_1$ (>td) (block 225; Lamp: OFF). On the other hand, if the engine is rotating and is being cranked or if the engine is not rotating and is being cranked; that is, if the engine is being cranked regardless of whether the engine is rotating or not, the detected catalyst temperature $t_a$ is not written into the memory and the initialized temperature $t_1$ stored in the memory is not changed (block 244; Lamp: oN). In summary, the engine operating condition is checked using revolution signal $S_1$ and a start signal $S_2$.

Finally, the arithmetic operations shown in FIG. 2(*c*) are excecuted. In this flowchart, if the engine is rotating (block 232) and the catalyst temperature $t_a$ is higher than the danger temperature $t_d$ (block 233), the indicator lamp 18 is turned on (block 234). If $t_a$ is lower than $t_d$, the lamp 18 goes off (block 235). In addition, if the engine is not rotating, no comparison of catalyst temperature $t_a$ is made, and control returns directly from RETURN (block 236) to START (block 231).

Accordingly, the following operation can be expected in accordance with the flowcharts in FIG. 2, when engine operation and the microcomputer are normal:

(1) When the power switch 24 is closed, the indicator lamp 18 goes off, since a reset signal $S_5$ initializes the internal conditions of the microcomputer 14 (block 211). After the system is reset, the catalyst temperature t is initialized to a predetermined temperature $t_1$ higher than the danger temperature $t_d$ (block 212).

(2) While the engine is cranked even if the engine is rotating, the indicator lamp 18 comes on, since the actually detected catalyst temperature $t_a$ is not written in the memory, and the stored valve of $t_1$ ($>t_d$) is unchanged. (block 224).

(3) After the engine has been cranked, that is, when the engine is running, the indicator lamp 18 goes off since the detected catalyst temperature $t_a$ is written in to memory to replace the stored value of $t_1$ ($>t_d$) (block 225) and the catalyst temperature is normal (block 235).

However, in the case where the catalyst temperature is abnormal when the engine is running (that is, the temperature $t_a$ is above $t_d$), as a matter of course, the indicator lamp 18 comes on to indicate an abnormal condition.

As described above, by checking that the indicator lamp 18 comes on only during cranking operation, it is possible to decide that the microcomputer is normal.

Furthermore, if the program is changed so that the indicator lamp is turned on by the reset signal $S_5$ and the catalyst temperature is initialized to $t_2$ which is less than the danger temperature $t_d$, it is also possible to make the indicator lamp 18 come on from the time when the power switch 24 is turned on to the time when the engine is cranked, and to make the indicator lamp 18 go off while the engine is being cranked (since $t_2<t_d$). In this case, if the catalyst temperature is normal, the indicator lamp 18 goes off while the engine is rotating, since actual catalytic temperatures are written into memory and are normally lower than the danger temperature $t_d$.

As described above, according to the flowchart shown in FIG. 2, it is determined that the mirocomputer 14 is normal when the indicator lamp 18 comes on only while the engine is being cranked, or from the time when the power is turned on to the time when the engine is cranked.

Figure 3:
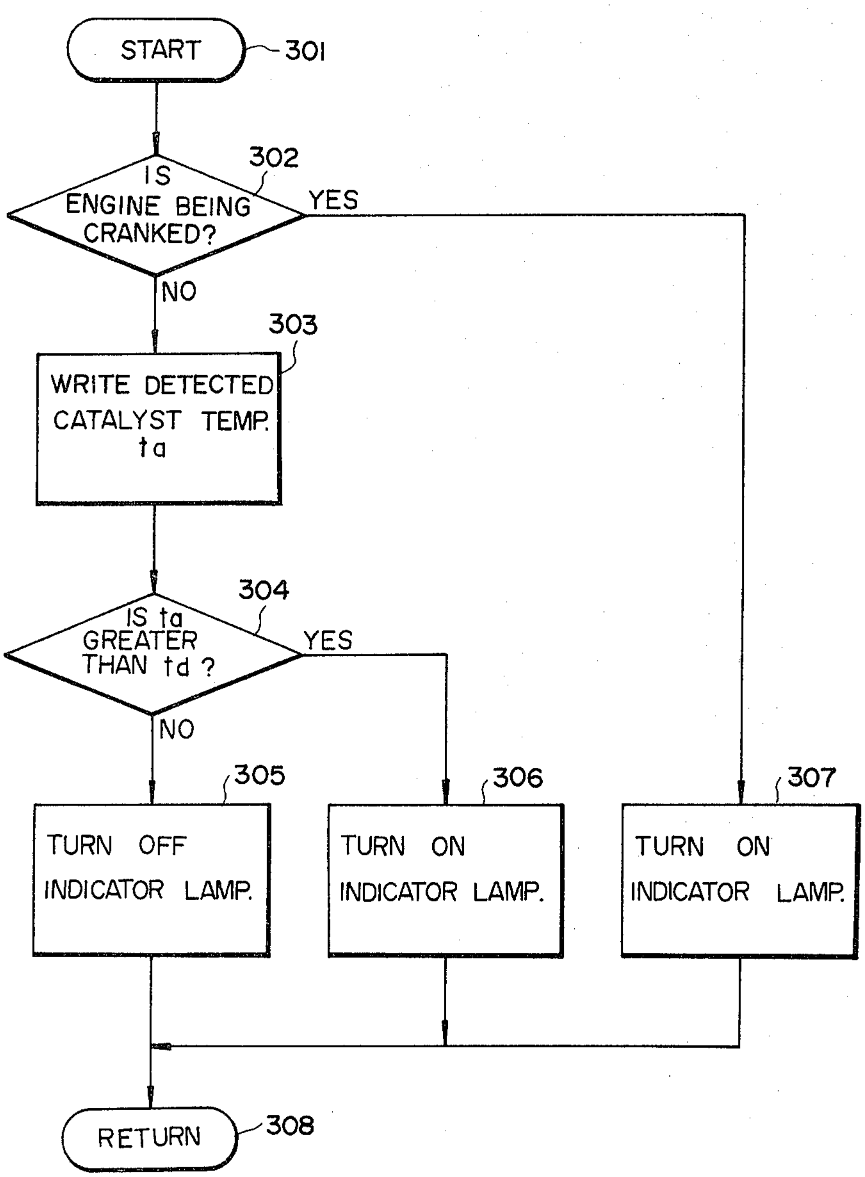
FIG. 3 is a flowchart showing another example of the test procedure of the present invention.

FIG. 3 is a flowchart of a second embodiment of the present invention. In this case, the test is made by using only the start signal $S_2$. Therefore, the indicator lamp 18 comes on while the engine is being cranked regardless of other conditions. If the engine is not being cranked, the indicator lamp 18 comes on only when the catalyst temperature $t_a$ exceeds the danger temperature $t_d$.

The operation of this embodiment is now described in detail with reference to FIG. 3:

First, the engine operating condition is checked as to whether or not the engine is being cranked (block 302). If the engine is being cranked, the indicator lamp 18 comes on (block 307). If the engine is not being cranked, the detected catalyst temperature $t_a$ is written into the memory to replace the previous value thereof (block 303).

Next, the temperature $t_a$ is compared with the danger temperature $t_d$ (block 304). If $t_a$ is lower than $t_d$, the indicator lamp 18 goes off (block 305).

Accordingly, if the indicator lamp comes on only while the engine is being cranked (that is, while the starter motor is rotating) and goes off immediately after the engine begins to rotate, the system is considered as operating normally.

The following advantages of the present invention will be seen from a consideration of the embodiments described above.

The testing procedure is reset simply by generating a reset signal $S_5$ again (turn the power switch off and on again).

Figure 4:
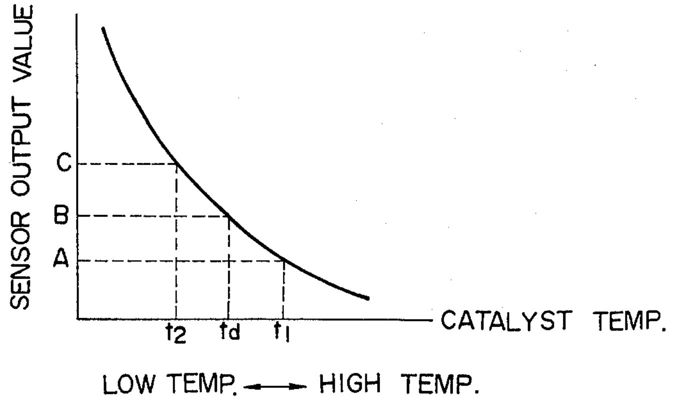
FIG. 4 is a graph showing an example of relationship between catalyst temperature and catalyst sensor output value.

If a sensor such as a thermistor is used for detecting the catalyst temperature t, the sensor output values are inversely proportional to the detected temperature (see FIG. 4). Therefore, the values handled internally by the microcomputer vary in the opposite way to the temperature values which they represent. Thus, the signs of the various relations involved may in practical implementation appear to be reversed; however, the above description is in terms of the underlying represented temperature value, the algorithm is the same. In FIG. 4, even if the catalyst temperature $t_1$ is higher than the danger temperature $t_d$ and $t_2$ is lower than $t_d$, the senor output value A corresponding to $t_1$ is smaller than the danger output value B corresponding to $t_d$, and the sensor output value C corresponding to $t_2$ is greater than output value B.

In addition, although a signal indicator lamp is used for displaying the conditions of both the catalyst temperature and the computer system in the above embodiments, it is possible to use two separate indicator lamps or other alarm means, such as light emitting diodes, or alternatively, audible warning devices such as buzzers.

In addition, in the above embodiments, the actually detected operating parameter is the catalyst temperature. However, other engine operating parameters such as revolution speed, intake air rate, and engine cooling water temperature can be detected for controlling engine operating values. Also, the predetermined engine operating value is catalyst temperature, but other values such as fuel injection rate, ignition advance angle, and exhaust gas recirculation rate are also controllable by a system of this type.

As stated above, according to the present invention, it is possible to readily test the computer only by changing the program. As a result, it is possible to readily repair the control system for an internal combustion engine without removing the microcomputer from the vehicle or without spending much time to diagnose parts other than the computer.

Although it is impossible to locate the failure location in the microcomputer, it is possible to decide with ease whether or not the microcomputer is operating normally whenever the engine is started.

If is further to be understood by those skilled in the art that the foregoing description is in terms of preferred embodiments of the present invention wherein various changes and modifications may be made without departing from the spirit and scope of the invention, which is to be defined by the appended claims.

What is claimed is:

1. A method of self-testing a control system for an internal combustion engine of the type having a microcomputer with a memory, which comprises the following steps:

(a) detecting on/off states of starting signals of the internal combustion engine and supplying a signal indicative of the detected state to the microcomputer, the state indicating signal being stored in the memory;

(b) displaying the states of the starting signals on a display means by supplying an indication of the stored state indicating signal to the display means;

(c) writing a predetermined engine controlling value in the memory;

(d) detecting an actual engine controlling value;

(e) in the microcomputer subsequently comparing the actually detected engine controlling value with the predetermined engine controlling value; and (f) lastly supplying a signal from the microcomputer to the display means so an actually controlled state of the engine controlling value is displayed by the display means while the engine is rotating.

2. A method of self-testing a control system for an internal combustion engine as recited in claim 1, wherein the starting signals of an internal combustion engine are a power signal generated when a power supply switch is turned on, a start signal generated when the engine is cranked, and a revolution signal generated when the engine is rotating.

3. A method of self-testing a control system for an internal combustion engine as recited in claim 1, wherein the time intervals when on/off states of the start signals are displayed are between the beginning of the start signal and the end of the start signal, between a power signal and the beginning of the start signal, and between the power signal and the end of the start signal.

4. A method of self-testing a control system for an internal combustion engine as recited in claim 1, wherein the predetermined engine controlling values are catalyst temperature, fuel injection rate, ignition advance angle, and exhaust gas recirculation rate.

5. A method of self-testing a control system for an internal combustion engine as recited in claim 1, wherein the actually detected engine operating parameters are catalyst temperature, revolution speed, intake air rate, and engine cooling water temperature.

6. A method of self-testing a control system for an internal combustion engine as recited in claim 1, wherein said display means is used for displaying both the states of the starting signals and the actually controlled states of the engine controlling value.

7. A method of self-testing a control system for an internal combustion engine of the type having a microcomputer with a memory, which comprises the following steps:

(a) resetting the microcomputer in response to a reset signal being derived from a reset circuit to turn an indicator lamp off in response to a power switch being turned on;

(b) setting in the memory a catalyst temperature which is higher than a danger temperature;

(c) detecting whether or not the engine is rotating;

(d) detecting whether or not the engine is being cranked;

(e) turning the indicator lamp on in accordance with the catalyst temperature set at step (b) to test the system only while the engine is being cranked;

(f) turning the indicator lamp off in response to an actually detected temperature being lower than the danger temperature while the engine is rotating by supplying a signal from the mirocomputer to the indicator lamp;

(g) turning the indicator lamp on in response to detected temperature being higher than the danger temperature while the engine is rotating by supplying a signal from the microcomputer to the indicator lamp.

8. A method of self-testing a control system for an internal combustion engine of the type having a microcomputer with a memory, which comprises the following steps:

(a) detecting whether or not the engine is being cranked;

(b) turning an indicator lamp on to test the system only while the engine is being cranked by supplying a signal from the microcomputer to the lamp;

(c) supplying a signal having a value indicative of an actually detected catalyst temperature to the computer;

(d) turning the indicator lamp on in response to an actually detected temperature being higher than the danger temperature while the engine is not being cranked by supplying a signal from the microcomputer to the lamp;

(e) turning the indicator lamp off in response to an actually detected temperature being lower than the danger temperature while the engine is not being cranked by supplying a signal from the microcomputer to the lamp.

9. An indicating system for an internal combustion engine comprising:

(a) a first sensor for detecting whether the engine is in a starting state;

(b) a second sensor for detecting an engine operating condition;

(c) an indicator; and (d) a microcomputer responsive to the first and second sensors for controlling the indicator, said microcomputer being programmed to activate the indicator in response to either: the first sensor indicating that the engine is in a starting state on the second sensor indicating an abnormal value for the engine operating condition.

10. The indicating system of claim 9, wherein the engine operating condition is a temperature sensed in a catalytic converter.

11. An indicating system for an internal combustion engine comprising:

(a) a first sensor for detecting whether the engine is in a starting state;

(b) a second sensor for detecting an engine operating condition;

(c) an indicator;

(d) a memory element storing a value indicating the engine operating condition; and (e) a microcomputer responsive to the first and second sensors for controlling the indicator; said microcomputer containing:

program (i) for continuously updating the memory element with a value which indicates the engine operating condition that is read from the second sensor only in response to the first sensor failing to indicate that the engine is in the starting state;

program (ii) for initializing the memory element to a value indicating an abnormal state of the engine operating condition in response to the first sensor indicating that the engine is in the starting state; and program (iii) for activating the indicator in response to the memory element containing a value indicating an abnormal state of the engine operating condition.

12. The indicating system of claim 9, 10 or 11 wherein the first sensor comprises an ignition switch.

13. The indicating system of claim 11, wherein the engine operating condition is a temperature sensed in a catalytic converter.

14. The indicating system of claim 13 wherein the value to which the memory element is initialized by program (ii) represents a temperature higher than the maximum temperature permissible in the catalytic converter.

15. Apparatus for self-testing a control system of an internal combustion engine, said control system including a microcomputer having a memory in which is written a predetermined engine controlling value, means for detecting on/off states of starting signals of the internal combustion engine, means for detecting an actual engine controlling value, means for comparing an actually detected engine controlling value with the predetermined engine controlling value; and means for displaying the states of the starting signals and an actually controlled state of the engine controlling value while the engine is being driven.

16. The apparatus of claim 15 wherein the means for detecting on/off states of starting signals of the internal combustion engine includes means responsive to activation of a power supply switch to an on condition, means responsive to the engine being cranked, and means responsive to a signal indicative of the engine speed.

17. The apparatus of claim 15 wherein the displaying means includes means for displaying the on/off states of the start signals between the beginning of a start signal and the end of a start signal, between the occurrence of a power signal and the beginning of the start signal, and between the occurrence of the power signal and the end of the start signal.

18. The apparatus of claim 15 wherein the predetermined engine controlling values written in the memory are signals indicative of catalyst temperature, fuel injection rate, ignition advance angle, and exhaust gas recirculation rate.

19. The apparatus of claim 5 wherein the means for detecting includes means for detecting catalyst temperature, means for detecting engine revolution speed, means for detecting intake air rate, and means for detecting engine cooling temperature.

20. The apparatus of claim 15 wherein the display means includes means for displaying the states of the starting signals and of the actually controlled states of the engine controlling value.

21. Apparatus for self-testing a control system of an internal combustion engine, said control system including a microcomputer having a memory having a value stored therein indicative of a catalyst danger temperature, an indicator lamp, a reset circuit for deriving a reset signal in response to a power switch for the microcomputer being closed to supply power to the microcomputer, means for resetting the microcomputer in response to the reset circuit deriving a reset signal, means responsive to the microcomputer being reset to deactivate the indicator lamp, means for detecting whether or not the engine is rotating, means for detecting whether or not the engine is being cranked, means for detecting the temperature of gasses in a catalyst responsive to gasses from the internal combustion engine, means for coupling signals from the detector means to the microcomputer, the memory of the microcomputer being programmed to be responsive to the signal from the engine rotating detecting means to supply a signal to the indicator lamp to turn the indicator lamp on in accordance with the set catalyst temperature to test the control system only while the engine is being cranked, the memory being programmed to be responsive to the engine rotating detecting means and the temperature detecting means to supply the indicator lamp with a signal to turn the indicator lamp off in response to an actually detected temperature being lower than the danger temperature while the engine is rotating, the memory being programmed to be responsive to the signals from the engine rotating means and the temperature detecting means to supply a signal to the indicator lamp to turn the indicator lamp on in response to an actually detected temperature being higher than the danger temperature while the engine is rotating.

22. Apparatus for self-testing a control system of an internal combustion engine, the control system including a microcomputer having a pre-programmed memory storing a signal indicative of a danger temperature for gasses of a catalytic converter responsive to gasses of the internal combustion engine, means for detecting whether or not the engine is being cranked, means for detecting the temperature of the gasses of the catalytic converter, an indicator lamp responsive to a signal derived from the microcomputer, means for coupling signals derived from the engine cranking detecting means and from the temperature detecting means to the microcomputer, the microcomputer memory being programmed to respond to the signal from the engine cranking detecting means to supply a signal to the indicator lamp to turn on the indicator lamp to test the control system only while the engine is being cranked, the memory being programmed to respond to the signals from the temperature detecting means and the engine crank detecting means for supplying a signal to the indicator lamp to turn the indicator lamp on in response to the actually detected temperature being higher than the danger temperature while the engine is not being cranked, the memory being programmed to respond to the signals from the temperature detecting means and the engine crank detecting means for supplying a signal to the indicator lamp to turn the indicator lamp off in response to the actually detected temperature being lower than the danger temperature while the engine is not being cranked.

* * * * *